United States Patent Office 2,892,853
Patented June 30, 1959

2,892,853

(ALKYL AND ARYL SULFINYL)- AND (ALKYL AND ARYL SULFONYL)-UNDECANOIC ACIDS

Nathan H. Koenig, Elkins Park, and Daniel Swern, Philadelphia, Pa., assignors to the United States of America as represented by the Secretary of Agriculture No Drawing. Application September 17, 1957
Serial No. 684,627

1 Claim. (Cl. 260—400)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of our co-pending applications entitled "(Alkylthio)-, (Acetylthio)- and (Arylthio)-undecanoic Acids," Serial No. 662,299, filed May 28, 1957 and "Long-Chain Sulfides," Serial No. 637,334, filed January 30, 1957.

In the copending applications of reference we disclosed the preparation of sulfur-containing derivatives of 10-undecenoic acid. Among those particularly described were (alkylthio)-, (arylthio)- and (aralkylthio)-undecanoic acids formed by the addition of thiols (alkyl, aryl and aralkyl mercaptans) to 10-undecenoic acid. These sulfur-containing derivatives have the general formula $RS(CH_2)_{10}COOH$, in which R is an alkyl, aryl, aralkyl or substituted alkyl group as defined later.

The present invention relates to oxidation products of these (alkylthio)-, (arylthio)- and (aralkylthio)-undecanoic acids, in particular to the sulfoxides and sulfones of the substituted (thio)-undecanoic acids. The invention also relates to methyl esters of some of these sulfoxides and sulfones.

The new sulfoxides of the present invention are (alkylsulfinyl)-, (substituted alkylsulfinyl)-, (arylsulfinyl)- and (aralkylsulfinyl)-undecanoic acids and they have the general formula $RSO(CH_2)_{10}COOH$ where R is a radical selected from the group consisting of methyl, n-propyl, n-butyl, n-hexyl, n-heptyl, n-octyl, n-undecyl, n-dodecyl, carboxymethyl, benzyl, phenyl, and 2-naphthyl. These compounds are prepared by controlled oxidation of the corresponding substituted (thio)-undecanoic acids, $RS(CH_2)_{10}COOH$, with bromide-bromate solution, although the method of oxidation is not critical.

The new sulfones of the present invention are (alkylsulfonyl)-, (substituted alkylsulfonyl)-, (arylsulfonyl)-, and (aralkylsulfonyl)-undecanoic acids and they have the general formula $RSO_2(CH_2)_{10}COOH$ where R is a radical selected from the group consisting of n-propyl, n-butyl, n-hexyl, n-heptyl, n-octyl, n-undecyl, n-dodecyl, carboxymethyl, 2-hydroxyethyl, benzyl, phenyl, and 2-naphthyl. These compounds are prepared from the corresponding substituted (thio)-undecanoic acids by oxidation with peracetic acid.

Methyl esters of some of the new compounds have been prepared from the corresponding acids by treatment with methanol and an acid catalyst. These esters may be represented by the general formulas $RSO(CH_2)_{10}COOCH_3$ and $RSO_2(CH_2)_{10}COOCH_3$ where R is a radical selected from the group consisting of n-octyl, benzyl and phenyl.

The sulfoxides and sulfones of the present invention are useful in the preparation of materials having diverse applications, as, for example, metallic salts for soaps, surface active agents, gelling agents, antibacterial agents, esters for plastitcizers and lubricant additives, and amine derivatives for polymerization accelerators.

The following examples are representative of the preparation of the compounds of the present invention. Identifying characteristics of the new compounds were determined and are presented in tabular form in Tables I–III.

EXAMPLE 1

*11-(n-heptylsulfinyl)-undecanoic acid.*—11-(n-heptylthio)-undecanoic acid (12.7 g., 0.04 mole) was suspended in 300 ml. of acetic acid containing 15 ml. of concentrated hydrochloric acid. A 0.50 N aqueous stock solution was made containing 13.9 g. of potassium bromate and 50 g. of potassium bromide per liter. Bromate-bromide solution (157 ml., 0.08 equivalent) was added to the well-stirred sulfide suspension over a 1½ hour period. The temperature remained below 30° and the addition was carried out dropwise to permit discharge of the intermediate yellow color. Completion of the reaction was indicated by a relatively permanent yellow color. At this point, the reaction mixture was diluted to 1 liter with water and cooled to 4°. The resulting precipitate, when filtered, washed and dried, gave 12.8 g. of fairly pure 11-(n-heptylsulfinyl)-undecanoic acid as a white powder, M.P. 82°. The analytical sample, M.P. 82°, was obtained as shiny plates by crystallization from acetone at 4°.

EXAMPLES 2–13

The other sulfoxides of Table I were prepared, as described in Example 1, from the corresponding sulfides by controlled oxidation with acidified bromate-bromide solution. Slight variations in the reaction and isolation conditions were made to accommodate differences in rates of oxidation or solubility of the other sulfides and sulfoxides. Characteristics of the sulfoxides are given in Table I.

In the preparation of 11-(n-propylsulfinyl)-undecanoic acid, two forms of this compound were isolated. The method of preparation, sharp melting points, and analytical values indicate that the compound has polymorphic forms (different arrangements of the molecules in the solid state). Additional evidence was obtained from the infrared spectra, which differed for solid samples but not in solution.

EXAMPLE 14

*11-(n-heptylsulfonyl)-undecanoic acid.*—11-(n-heptylthio)-undecanoic acid (15.8 g., 0.05 mole) was suspended in 100 ml. of acetic acid. Peracetic acid (20 ml. of 40% acid in acetic acid, 0.12 mole) was added with stirring over a 15 minute period at such a rate that the maximum temperature did not exceed 70°. The reaction mixture was diluted with 400 ml. of water and the precipitate was filtered, washed with water and dried. The product obtained in 98% yield was moderately pure 11-(n-heptylsulfonyl)-undecanoic acid, M.P. 110–111° and neutralization equivalent, 346. The analytically pure sample described in Table II was obtained by recrystallization from acetonitrile.

EXAMPLES 15–25

The other sulfones of Table II were prepared from the corresponding sulfides by oxidation with peracetic acid by slight modifications of the procedure of Example 14. 11-(carboxymethylsulfonyl)-undecanoic acid (Example 21) and 11-(2-hydroxyethylsulfonyl)-undecanoic acid (Example 22) were gel-like products at first but gave anhydrous solids after drying by adsorbents and by recrystallization. In the preparation of 11-(benzylsulfonyl)-undecanoic acid (Example 23), water was not added after the peracetic acid. Instead, the mixture was evaporated in vacuo over sodium hydroxide and then purified by recrystallization. Characteristics of the sulfones are given in Table II.

EXAMPLE 26

*Methyl 11-(n-octylsulfonyl)-undecanoate.* — 11-(n-octylsulfonyl)-undecanoic acid (Example 18, Table II, 1.3 g., 0.0036 mole) was added to 10 ml. (0.25 mole) of methanol containing 26 mg. of naphthalene-2-sulfonic acid as a catalyst. The mixture was refluxed for 16 hours, and the solution was diluted to 90 ml. with hot methanol and cooled to 13° to obtain 0.86 g. of methyl 11-(n-octylsulfonyl)-undecanoate, a white crystalline solid, M.P. 77°. An additional 0.33 g. of this compound was obtained by cooling the mother liquor to 4°.

EXAMPLES 27–31

The other methyl esters of Table III were prepared substantially by the method described in Example 26 from the corresponding (alkylsulfinyl)-, (arylsulfinyl)-, (alkylsulfonyl)- and (arylsulfonyl)-undecanoic acids. The structures were established by elementary analysis and infrared spectra. Characteristics of these esters are given in Table III.

*Table I*

(Alkylsulfinyl)- and (Arylsulfinyl)-Undecanoic Acids, $RSO(CH_2)_{10}COOH$

| Example Number | R | Formula | M.P., °C.[a] | Neut. equiv. | | Carbon, Percent | | Hydrogen, Percent | | Sulfur, Percent | |
|---|---|---|---|---|---|---|---|---|---|---|---|
| | | | | Calcd. | Found | Calcd. | Found | Calcd. | Found | Calcd. | Found |
| 2 | Methyl | $C_{13}H_{26}O_3S$ | 87 | 248 | 254 | 58.0 | 58.2 | 9.74 | 9.69 | 12.9 | 12.7 |
| 3 | n-Propyl[b] | $C_{14}H_{28}O_3S$ | 66 | 276 | 277 | 60.8 | 60.4 | 10.2 | 10.2 | 11.6 | 11.4 |
| 4 | do[b] | $C_{14}H_{28}O_3S$ | 60 | 276 | 279 | 60.8 | 61.2 | 10.2 | 10.4 | 11.6 | 11.4 |
| 5 | n-Butyl | $C_{15}H_{30}O_3S$ | 76 | 290 | 292 | 62.0 | 62.1 | 10.4 | 10.6 | 11.0 | 11.0 |
| 6 | n-Hexyl | $C_{17}H_{34}O_3S$ | 83 | 319 | 323 | 64.1 | 64.1 | 10.8 | 10.9 | 10.1 | 9.9 |
| 1 | n-Heptyl | $C_{18}H_{36}O_3S$ | 82 | 333 | 335 | 65.0 | 64.8 | 10.9 | 10.9 | 9.64 | 9.50 |
| 7 | n-Octyl | $C_{19}H_{38}O_3S$ | 88 | 347 | 345 | 65.8 | 65.5 | 11.1 | 10.8 | 9.25 | 9.32 |
| 8 | n-Undecyl | $C_{22}H_{44}O_3S$ | 94 | 389 | 394 | 68.0 | 67.8 | 11.4 | 11.6 | 8.25 | 8.19 |
| 9 | n-Dodecyl | $C_{23}H_{46}O_3S$ | 95 | 403 | [c] 413 | 68.6 | 68.9 | 11.5 | 11.8 | 7.96 | 7.77 |
| 10 | Carboxymethyl | $C_{13}H_{24}O_5S$ | 92 | 146 | 147 | 53.4 | 53.5 | 8.27 | 8.35 | 11.0 | 10.4 |
| 11 | Benzyl | $C_{18}H_{28}O_3S$ | 83 | 324 | 325 | 66.6 | 66.4 | 8.70 | 8.57 | 9.88 | 9.90 |
| 12 | Phenyl | $C_{17}H_{26}O_3S$ | 61 | 310 | 311 | 65.8 | 66.0 | 8.44 | 8.84 | 10.3 | 10.4 |
| 13 | 2-Naphthyl | $C_{21}H_{28}O_3S$ | 85 | 361 | 378 | 69.9 | 70.0 | 7.85 | 7.80 | 8.89 | 8.94 |

[a] Determined with a micro hot stage.
[b] Polymorphic forms were isolated.
[c] Approximate value; insoluble material gave erratic results.

*Table II*

(ALKYLSULFONYL)— AND (ARYLSULFONYL)— UNDECANOIC ACIDS, $RSO_2(CH_2)_{10}COOH$

| Example Number | R | Formula | M.P., °C.[a] | Neut. equiv. | | Carbon, Percent | | Hydrogen, Percent | | Sulfur, Percent | |
|---|---|---|---|---|---|---|---|---|---|---|---|
| | | | | Calcd. | Found | Calcd. | Found | Calcd. | Found | Calcd. | Found |
| 15 | n-Propyl | $C_{14}H_{28}O_4S$ | 101 | 292 | 293 | 57.5 | 57.3 | 9.65 | 9.69 | 11.0 | 10.6 |
| 16 | n-Butyl | $C_{15}H_{30}O_4S$ | 104 | 306 | 307 | 58.8 | 59.2 | 9.9 | 10.3 | 10.5 | 10.4 |
| 17 | n-Hexyl | $C_{17}H_{34}O_4S$ | 110 | 335 | 333 | 61.0 | 60.7 | 10.2 | 10.5 | 9.59 | 9.46 |
| 14 | n-Heptyl | $C_{18}H_{36}O_4S$ | 112 | 349 | 348 | 62.0 | 62.2 | 10.4 | 10.2 | 9.20 | 9.19 |
| 18 | n-Octyl | $C_{19}H_{38}O_4S$ | 114 | 363 | 364 | 63.0 | 62.5 | 10.6 | 10.3 | 8.84 | 8.90 |
| 19 | n-Undecyl | $C_{22}H_{44}O_4S$ | 119 | 405 | [b] 412 | 65.3 | 64.7 | 11.0 | 10.4 | 7.92 | 7.74 |
| 20 | n-Dodecyl | $C_{23}H_{46}O_4S$ | 117 | 419 | 424 | 66.0 | 66.2 | 11.1 | 11.2 | 7.66 | 7.48 |
| 21 | Carboxymethyl | $C_{13}H_{24}O_6S$ | 141 | 154 | 154 | 50.6 | 50.6 | 7.84 | 8.02 | 10.4 | 10.2 |
| 22 | 2-Hydroxyethyl[c] | $C_{13}H_{26}O_5S$ | 94–96 | 294 | 292 | 53.0 | 52.8 | 8.90 | 9.39 | 10.9 | 11.0 |
| 23 | Benzyl | $C_{18}H_{28}O_4S$ | 127 | 340 | 341 | 63.5 | 63.8 | 8.29 | 8.43 | 9.42 | 9.41 |
| 24 | Phenyl | $C_{17}H_{26}O_4S$ | 86 | 326 | 328 | 62.6 | 62.7 | 8.03 | 8.04 | 9.82 | 9.89 |
| 25 | 2-Naphthyl | $C_{21}H_{28}O_4S$ | 117 | 377 | 374 | 67.0 | 66.8 | 7.50 | 7.57 | 8.52 | 8.81 |

[a] Determined with a micro hot stage.
[b] Approximate value; insoluble material gave erratic results.
[c] Hydroxyl, percent: Calcd., 5.48; found, 5.26.

*Table III*

METHYL ESTERS, $RSO(CH_2)_{10}COOCH_3$ AND $RSO_2(CH_2)_{10}COOCH_3$, OF (ALKYLSULFINYL)- (ARYLSULFINYL)-, (ALKYLSULFONYL)- AND (ARYLSULFONYL)- UNDECANOIC ACIDS OF TABLES I AND II

| Example number | RSO or $RSO_2$ | Formula | M.P., °C.[a] | Carbon, percent | | Hydrogen, percent | | Sulfur, percent | |
|---|---|---|---|---|---|---|---|---|---|
| | | | | Calcd. | Found | Calcd. | Found | Calcd. | Found |
| 27 | n-Octylsulfinyl | $C_{20}H_{40}O_3S$ | 74 | 66.6 | 66.7 | 11.2 | 11.2 | 8.9 | 8.9 |
| 28 | Benzylsulfinyl | $C_{19}H_{30}O_3S$ | 69 | 67.4 | 67.0 | 8.93 | 8.82 | 9.5 | 9.2 |
| 29 | Phenylsulfinyl | $C_{18}H_{28}O_3S$ | 36–38 | 66.6 | 66.2 | 8.64 | 8.89 | | |
| 26 | n-Octylsulfonyl | $C_{20}H_{40}O_4S$ | 77 | 63.8 | 63.3 | 10.7 | 10.9 | 8.5 | 8.2 |
| 30 | Benzylsulfonyl | $C_{19}H_{30}O_4S$ | 80 | 64.4 | 64.0 | 8.53 | 8.58 | 9.0 | 8.8 |
| 31 | Phenylsulfonyl | $C_{18}H_{28}O_4S$ | 64 | 63.5 | 63.2 | 8.29 | 8.27 | 9.4 | 9.1 |

[a] Determined with a micro hot stage.

We claim:
A compound having the general formula

$$X-(CH_2)_{10}-CO_2Y$$

where X is selected from the group consisting of RSO— and $RSO_2$—, R being a radical selected from the group consisting of alkyl radicals containing from 1 to 12 carbon atoms, 2-hydroxyethyl, carboxymethyl, benzyl, phenyl, and 2-naphthyl, and Y is selected from the group consisting of H— and $CH_3$—.

References Cited in the file of this patent
UNITED STATES PATENTS
2,789,991   Brockman et al. _____ Apr. 23, 1957